(No Model.)
F. HART.
CENTRIFUGAL LIQUID SEPARATOR.
No. 496,120. Patented Apr. 25, 1893.
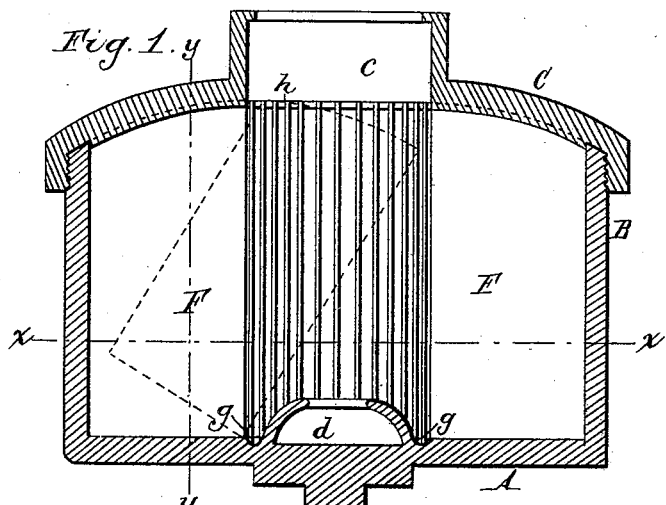
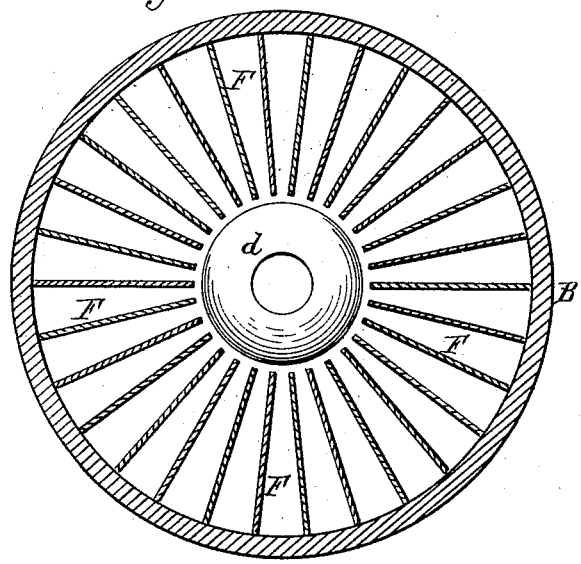
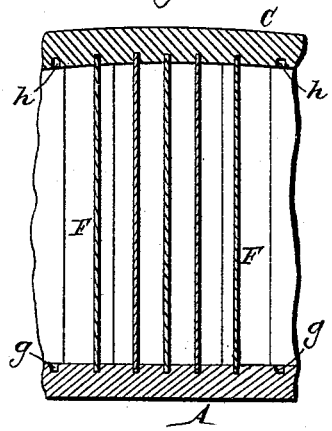
Witnesses:
Friedrich Günter Wilhelm.
Emil Neuhart
F. Hart Inventor.
By Wilhelm Bonner
Attorneys.
THE NORRIS PETERS CO., PHOTO-LITHO., WASHINGTON, D. C.

United States Patent Office.

FREDERICK HART, OF POUGHKEEPSIE, NEW YORK, ASSIGNOR TO THE AKTIEBOLAGET SEPARATOR, OF STOCKHOLM, SWEDEN.

CENTRIFUGAL LIQUID-SEPARATOR.

SPECIFICATION forming part of Letters Patent No. 496,120, dated April 25, 1893.

Application filed April 28, 1892. Serial No. 430,962. (No model.)

*To all whom it may concern:*

Be it known that I, FREDERICK HART, a subject of the Queen of Great Britain and Ireland, residing at Poughkeepsie, in the county of Dutchess and State of New York, have invented new and useful Improvements in Centrifugal Liquid-Separators, of which the following is a specification.

This invention relates to that class of centrifugal separators which are principally employed for separating milk into cream and skim milk and which are provided with detachable division or partition plates arranged radially, or nearly so, in the liquid space of the bowl.

The object of my invention is to improve the means whereby the plates are held in the bowl, so that they can be easily removed for cleaning the bowl and plates and inserted again when required for use.

In the accompanying drawings:—Figure 1 is a sectional elevation of a centrifugal separator provided with my improvements. Fig. 2 is a horizontal section in line $x$—$x$, Fig. 1. Fig. 3 is a fragmentary vertical section in line $y$—$y$, Fig. 1.

Like letters of reference refer to like parts in the several figures.

A represents the bottom of the bowl, B the side or peripheral wall thereof, and C the cover, which latter is secured to the upper end of the side wall by a screw-threaded flange or other suitable means. The cover is provided with a contracted neck $c$ through which the separated liquids are discharged by the usual means, for instance those described and shown in Letters Patent No. 293,314, dated February 12, 1884. The bottom may be provided with a central feed cup $d$.

F represents the partition or division plates which extend from the periphery of the bowl inwardly and which are arranged radially or nearly so. These plates are detachable from the bowl and its cover and are seated in grooves $g$ formed in the bottom of the bowl and grooves $h$ formed in the cover thereof. The centrifugal force generated by the rotation of the bowl exerts an outward pressure against these plates and holds the same firmly in place while the machine is in operation. The grooves are milled or otherwise formed in the upper surface of the bottom and the lower surface of the cover. In order to permit of the ready removal of the plates when a central feed cup is arranged on the bottom, the cover is curved concentric with the inner lower corner of the plate, so that the upper edge of the plate can be withdrawn from the upper groove by tilting the plate inwardly on its heel or lower inner corner, as indicated by dotted lines in Fig. 1. The plates are inserted and withdrawn through the neck of the bowl, which is made sufficiently large for that purpose. This construction of the bowl and plates permits the ready removal of the plates from the bowl, leaving the cavity of the latter unobstructed, so that it can be readily cleaned, and facilitating the cleaning of the plates themselves.

I claim as my invention—

The combination with a separator bowl provided with a groove in the upper side of its bottom and having a curved cover provided with a groove in its lower side, of a division plate resting in the groove of the bottom and having a curved upper edge which rests in the groove of the cover, the curvature of the cover and plate being such as to permit the plate to be tilted on its lower inner corner, substantially as set forth.

Witness my hand this 25th day of April, 1892.

FREDERICK HART.

Witnesses:
CHAS. E. OAKLEY,
GEO. W. OAKLEY.